(12) United States Patent
Kondo et al.

(10) Patent No.: US 6,584,538 B2
(45) Date of Patent: *Jun. 24, 2003

(54) INFORMATION PROCESSING SYSTEM

(75) Inventors: Nobukazu Kondo, Ebina (JP); Setsuko Kojima, Kawasaki (JP); Tomohisa Kohiyama, Yokohama (JP); Shigeto Oeda, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/987,843

(22) Filed: Nov. 16, 2001

(65) Prior Publication Data

US 2002/0032818 A1 Mar. 14, 2002

Related U.S. Application Data

(63) Continuation of application No. 09/053,069, filed on Apr. 1, 1998, now Pat. No. 6,330,629, which is a continuation-in-part of application No. 08/847,974, filed on Apr. 21, 1997, now Pat. No. 5,881,255.

(30) Foreign Application Priority Data

Apr. 1, 1997 (JP) .............................. 9-082566

(51) Int. Cl.⁷ .............................................. G06F 13/00
(52) U.S. Cl. ....................................................... 710/311
(58) Field of Search ................................. 710/305–315

(56) References Cited

U.S. PATENT DOCUMENTS

| | | | | |
|---|---|---|---|---|
| 5,086,426 A | * | 2/1992 | Tsukakoshi et al. | 370/405 |
| 5,321,819 A | * | 6/1994 | Szczepanek | 709/228 |
| 5,367,695 A | * | 11/1994 | Narad et al. | 370/402 |
| 5,428,771 A | * | 6/1995 | Daniels et al. | 370/466 |
| 5,446,868 A | * | 8/1995 | Gardea et al. | 703/27 |
| 5,671,371 A | * | 9/1997 | Kondo et al. | 710/311 |
| 5,673,399 A | * | 9/1997 | Guthrie et al. | 710/310 |
| 5,682,512 A | * | 10/1997 | Tetrick | 345/974 |
| 5,751,975 A | * | 5/1998 | Gillespie et al. | 370/402 |
| 5,761,458 A | * | 6/1998 | Young et al. | 710/311 |
| 5,768,548 A | * | 6/1998 | Young et al. | 710/306 |
| 5,815,205 A | * | 9/1998 | Hashimoto et al. | 348/373 |
| 5,835,739 A | * | 11/1998 | Bell et al. | 710/309 |
| 5,845,107 A | * | 12/1998 | Fisch et al. | 710/100 |
| 5,859,987 A | * | 1/1999 | Gillespie et al. | 710/104 |
| 5,859,988 A | * | 1/1999 | Ajanovic et al. | 710/100 |
| 5,881,255 A | * | 3/1999 | Kondo et al. | 710/313 |
| 5,913,045 A | * | 6/1999 | Gillespie et al. | 710/266 |
| 5,941,973 A | * | 8/1999 | Kondo et al. | 710/315 |
| 6,128,688 A | * | 10/2000 | Kondo et al. | 710/306 |
| 6,260,094 B1 | * | 7/2001 | Davis et al. | 710/311 |
| 6,330,629 B1 | * | 12/2001 | Kondo et al. | 710/29 |
| 6,341,323 B2 | * | 1/2002 | Kondo et al. | 710/305 |

FOREIGN PATENT DOCUMENTS

| | | |
|---|---|---|
| JP | 62266922 | 11/1987 |
| JP | 4315244 | 11/1992 |
| JP | A5233528 | 9/1993 |
| JP | 6022145 | 1/1994 |
| JP | 6291954 | 10/1994 |
| JP | 63211019 | 9/1998 |

* cited by examiner

*Primary Examiner*—Paul R. Myers
(74) *Attorney, Agent, or Firm*—Antonelli, Terry, Stout & Kraus, LLP

(57) ABSTRACT

An information processing system is configured such that which when an application handling multimedia, especially, moving images is performed by an information processor such as a personal computer, a sufficient processing performance is realized with the conventional CPU and bus capabilities. The information processing system includes a bus adaptor or bus converter for connecting a CPU bus and a system bus. The bus converter includes an operation processing unit (ALU) capable of performing a portion of an operating function performed by the conventional CPU or a portion of an operating function performed by an image processing board connected to the system bus, whereby the bus converter takes over a portion of a processing to be performed by the CPU or I/O module. Thereby, an overhead time for data transfer through the buses is reduced so that the total performance of the system is improved. Also, since a processing unqualified for the CPU, for example, a bit operation can be performed by a dedicated hardware, the information processing performance is improved.

24 Claims, 7 Drawing Sheets

INFORMATION PROCESSING SYSTEM

CROSS-REFERENCE TO RELATED APPLICATION

This application is a continuation of U.S. application Ser. No. 09/053,069, filed on Apr. 1, 1998 now U.S. Pat. No. 6,330,629, which is a continuation-in-part of U.S. application Ser. No. 08/847,974 filed on Apr. 21, 1997, now issued as U.S. Pat. No. 5,881,255, which is incorporated by reference herein.

BACKGROUND OF THE INVENTION

The present invention relates to an information processor such as a personal computer or a work station, and more particularly to an information processing system in which a plurality of internal buses are hierarchically connected through a bus adaptor or bus converter.

The prior art concerning a computer system including a plurality of internal buses hierarchically connected through a bus adaptor (or bus converter) has been disclosed in JP-A-5-233528.

In the prior art, it is generally known that in order to prevent the transfer by a low-speed I/O module from disturbing the transfer for a low-speed processor memory, independent buses including a processor bus, a system bus and an I/O bus are hierarchically connected to configure a system. The adjacent buses are connected by a bus adaptor (or bus converter). In a general information processor, it is generally known that the protocols of connected buses are different. Therefore, a protocol conversion processing is performed in the bus converter.

In the case where an application handling multimedia, especially, moving images is performed by an information processor such as a personal computer, the handling of a large amount of data may cause the case where the supply of data to be processed from the I/O side to a CPU or a main memory is not in time due to an overhead time for protocol conversion resulting from the hierarchization of buses. On the other hand, in the case where data processed by the CPU or the main memory is to be transferred to a display unit provided on the I/O bus side, there is also a possibility that the display at a fixed transfer rate becomes impossible. When a processing such as the compression/decompression of a moving image is taken into consideration, it may further be considered that the processing capacity of the CPU itself is insufficient even if the supply of data from the I/O side is in time.

SUMMARY OF THE INVENTION

An object of the present invention is to provide an information processing system in which in the case of an application handling multimedia, in particular, moving images are produced by an information processor such as a personal computer, and a load imposed on a CPU is distributed to realize a required processing performance with the conventional CPU and bus performances. More particularly, an object of the present invention is to provide a low-cost information processing system in which a plurality of internal buses are hierarchically connected through a bus adaptor and an application handling multimedia, in particular, moving images, is performed by an information processor such as a personal computer and in which a processing load of a CPU is reduced, making it possible to prevent the lowering of a throughput caused by a low-speed bus such as a system bus.

To attain the above object, one aspect of the present invention provides an information processing system in which a processing unit capable of performing an operation processing and an information processing is provided in a bus converter (called a bus adaptor of the information processing system) hierarchically connecting a plurality of internal buses, whereby a part of processings performed by a CPU and an I/O module in the conventional system can be taken over by the bus converter in parallel to the transfer of data.

Since the processing unit is provided in the bus converter, as mentioned above, the frequency of transfer in bus hierarchy transition is reduced in comparison with the case where the transfer of data before operation and the result of operation is made between the CPU bus side module, such as a CPU or a main memory, and the system bus side module such as a graphic device performing the high-speed processing of an MPEG moving image. Thereby, a load imposed on the buses can be reduced. Namely, an overhead time for data transfer is reduced, thereby improving the total performance of the system.

Also, since the bus converter hierarchically connecting the buses, by itself, takes over a portion of an operation for data to be processed, processings to be performed are prevented from concentrating on the CPU or the system bus side I/O module (such as a graphic device), thereby making it possible to reduce the costs of individual parts used in the system or to supplement a system performance even if a low-cost CPU is used.

Further, since a processing unqualified for the CPU, for example a bit operation, can be performed by a dedicated hardware provided in the bus converter or bus adaptor, the information processing capability can also be improved.

Other objects, features and advantages of the present invention will become apparent from reading of the following description of embodiments taken in conjunction with the accompanying drawings.

DESCRIPTION OF THE PREFERRED EMBODIMENTS

In the following, an embodiment of the present invention will be described in reference to FIGS. 1 to 6 and another embodiment thereof will be described with reference to FIG. 7.

Figure 1:
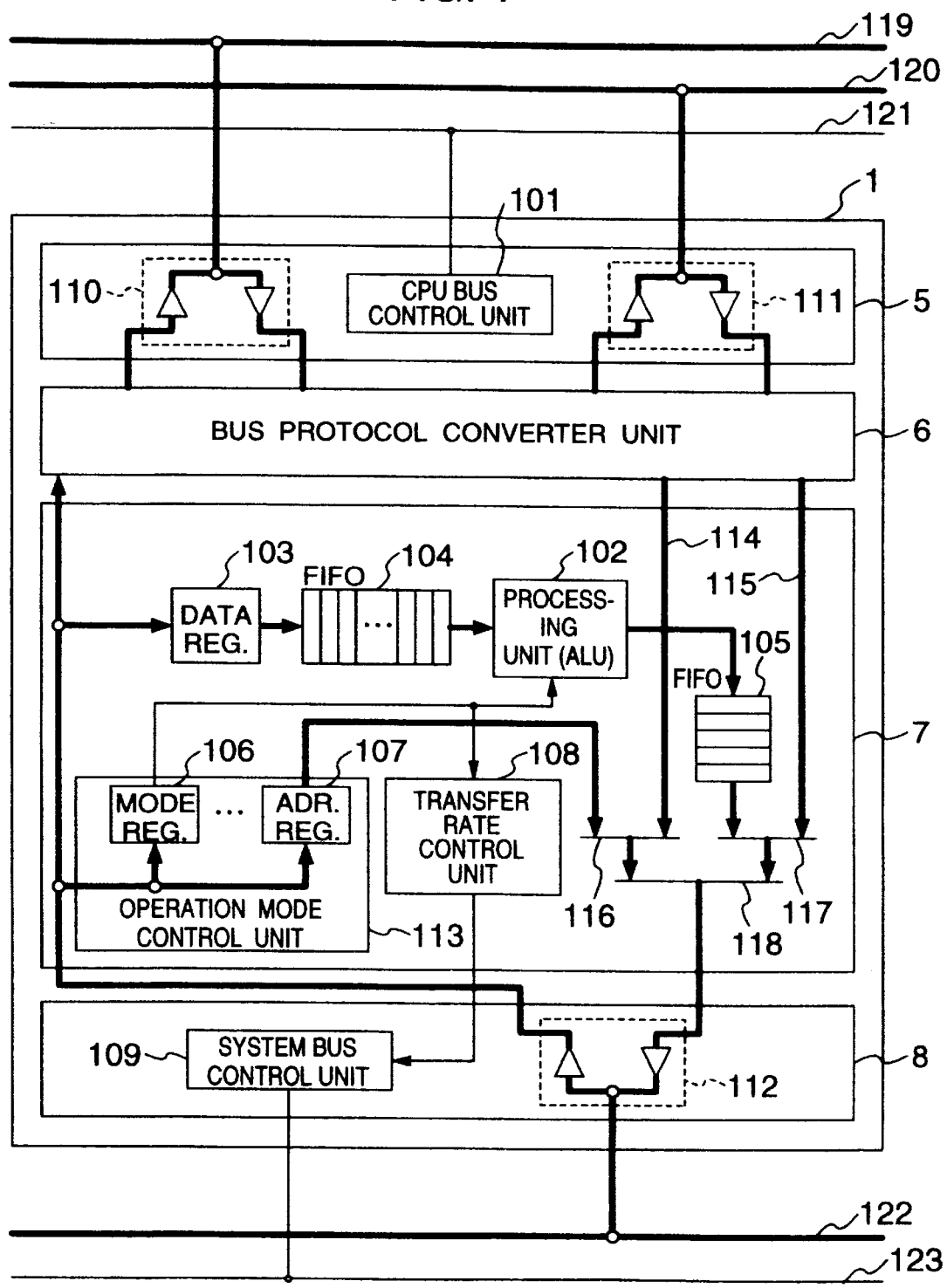
FIG. 1 is a detailed block diagram of a bus converter according to an embodiment of the present invention.

In FIG. 1, a reference numeral 1 denotes a bus converter which is generally called a bus adaptor and is specifically used for the present invention, numeral 5 a CPU bus interface in the bus converter 1, numeral 6 a bus protocol converter unit in the bus converter 1, numeral 7 an operation controller in the bus converter 1, numeral 8 a system bus interface in the bus converter 1, numeral 101 a CPU bus control unit in the CPU bus interface 5, numeral 102 a processing unit or arithmetic and logic unit (ALU) in the operation controller 7, numeral 103 an operation data register, numeral 104 a first-in first-out register (FIFO) for data before operation, numeral 105 an FIFO for data after operation, numeral 106 an operation mode setting register, numeral 107 an operation result transfer destination address register, numeral 108 a transfer rate control unit, numeral 109 a system bus control unit in the system bus interface 8, numerals 110, 111 and 112 bi-directional input/output buffers, numeral 113 an operation mode control unit, numeral 114 an address signal line from the bus protocol converter unit 6 to the operation controller 7, numeral 115 a data signal line from the bus protocol converter unit 6 to the operation controller 7, numerals 116, 117 and 118 selectors, numeral 119 an address signal line of a CPU bus 13 (see FIG. 2), numeral 120 a data signal line of the CPU bus 13, numeral 121 a control signal line of the CPU bus 13, numeral 122 a multiplexed address/data signal line of a system bus 14 (see FIG. 2), and numeral 123 a control signal line of the system bus 14.

Figure 2:
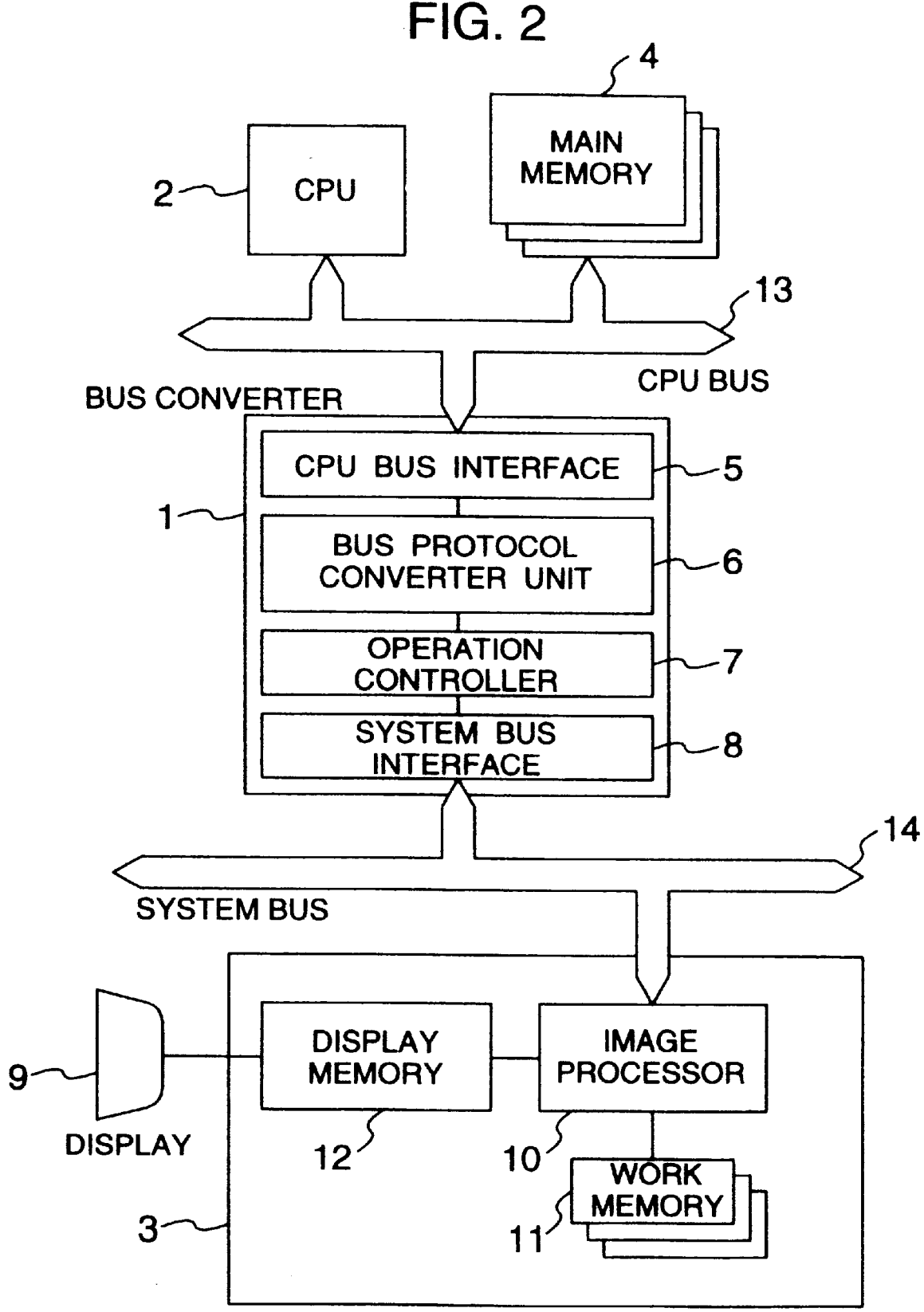
FIG. 2 is an epitomized block diagram showing the construction of a system according to the embodiment.

In FIG. 2, reference numeral 2 denotes a CPU, numeral 3 an image processing board having an interface for the system bus 14, numeral 4 a main memory, numeral 9 a display unit, numeral 10 an image processor in the image processing board 3, numeral 11 a work memory in the image processing board 3, and numeral 12 a display memory in the image processing board 3.

Figure 3:
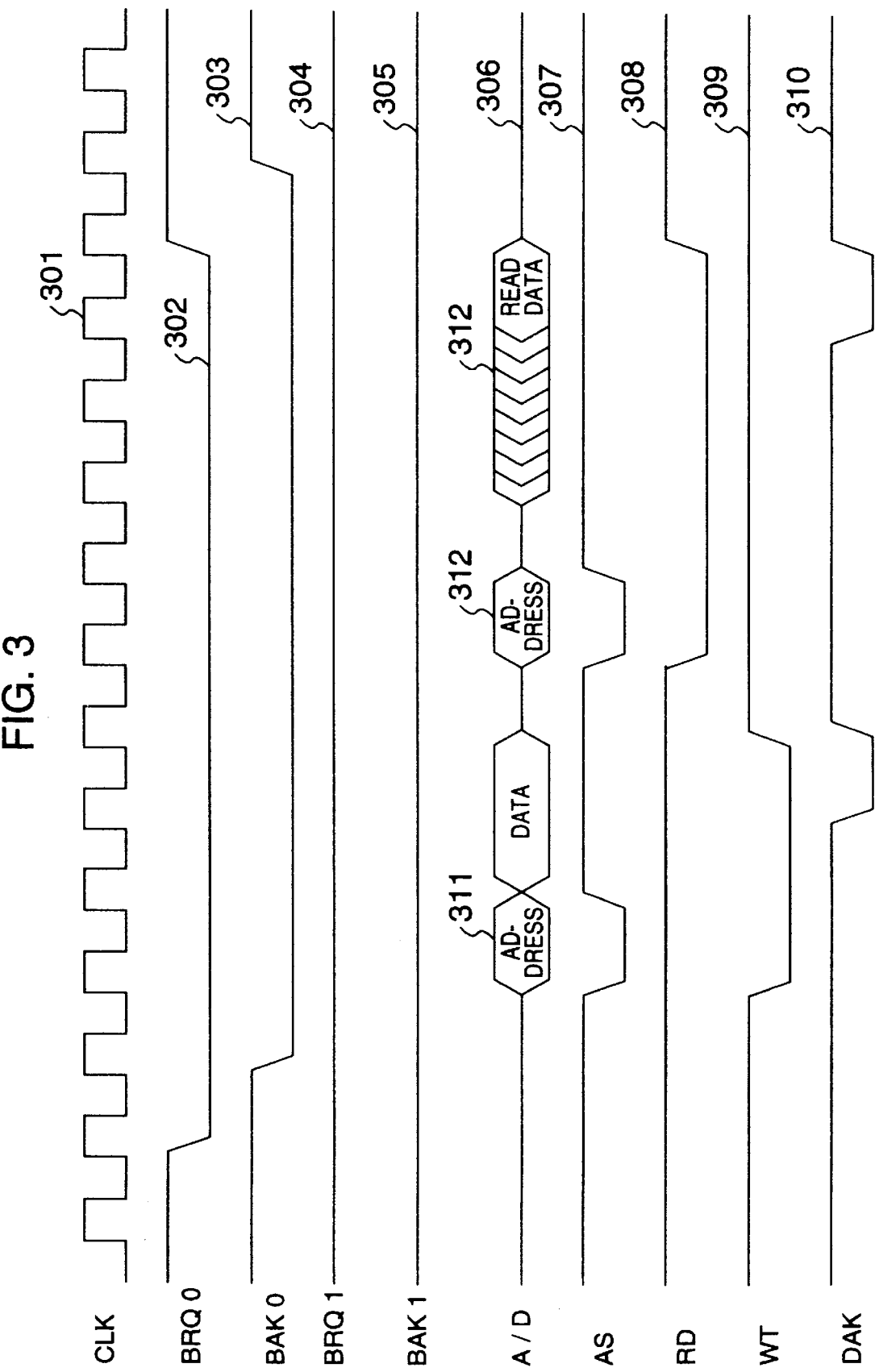
FIG. 3 is a timing chart showing one example of the timing of data transfer according to the embodiment.

In FIG. 3, reference numeral 301 denotes a system clock signal (CLK) of the system bus 14, numeral 302 a bus use request signal (BRQ0) for the system bus from the bus converter 1 to a system bus arbiter 601 (see FIG. 6), numeral 303 a bus use acceptance signal (BAK0) from the system bus arbiter 601 to the bus converter 1, numeral 304 a bus use request signal (BRQ1) for the system bus from the image processing board 3 to the system bus arbiter 601, numeral 305 a bus use acceptance signal (BAK1) from the system bus arbiter 601 to the image processing board 3, numeral 306 a multiplexed address/data signal line (A/D), numeral 307 an address strobe signal (AS) designating an address cycle, numeral 308 a read transfer designating signal (RD), numeral 309 a write transfer designating signal (WD), numeral 310 a data acknowledge signal (DAK) reporting the receipt of data, numeral 311 a write transfer cycle, and numeral 312 a read transfer cycle.

Figure 4:
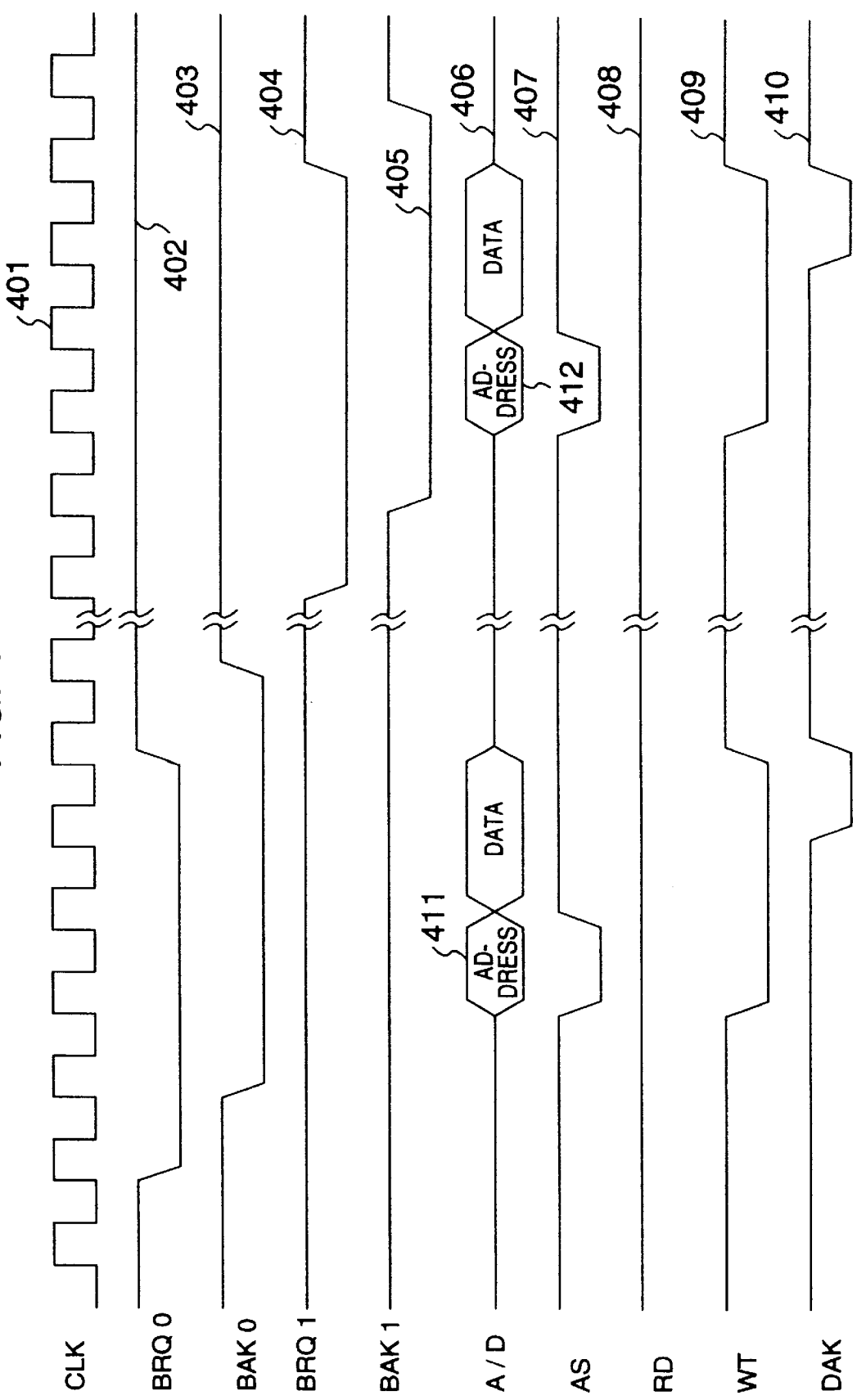
FIG. 4 is a timing chart showing another example of the timing of data transfer according to the embodiment.

In FIG. 4, reference numeral 401 denotes a system clock signal (CLK) of the system bus 14, numeral 402 a bus use request signal (BRQ0) for the system bus from the bus converter 1 to the system bus arbiter 601, numeral 403 a bus use acceptance signal (BAK0) from the system bus arbiter 601 to the bus converter 1, numeral 404 a bus use request signal (BRQ1) for the system bus from the image processing board 3 to the system bus arbiter 601, numeral 405 a bus use acceptance signal (BAK1) from the system bus arbiter 601 to the image processing board 3, numeral 406 a multiplexed address/data signal line (A/D), numeral 407 an address strobe signal (AS) designating an address cycle, numeral, 408 a read transfer designating signal (RD), numeral 409 a write transfer designating signal (WD), numeral 410 a data acknowledge signal (DAK) reporting the receipt of data, and numerals 411 and 412 write transfer cycles.

Figure 5:
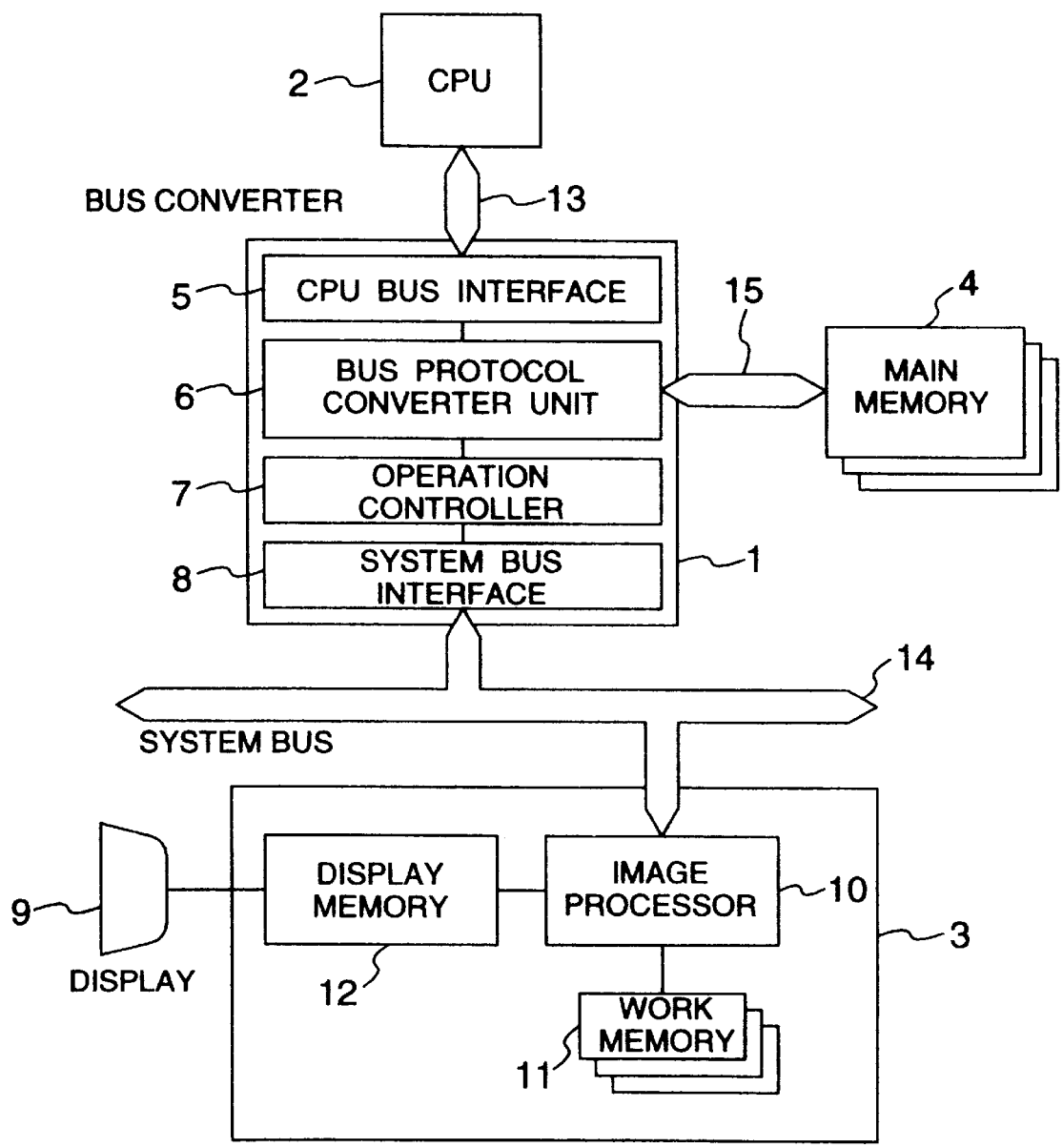
FIG. 5 is an epitomized block diagram showing the construction of an alternative to the system according to the embodiment.

In FIG. 5, reference numeral 15 denotes a main memory bus directly connected to the bus converter 1.

Figure 6:
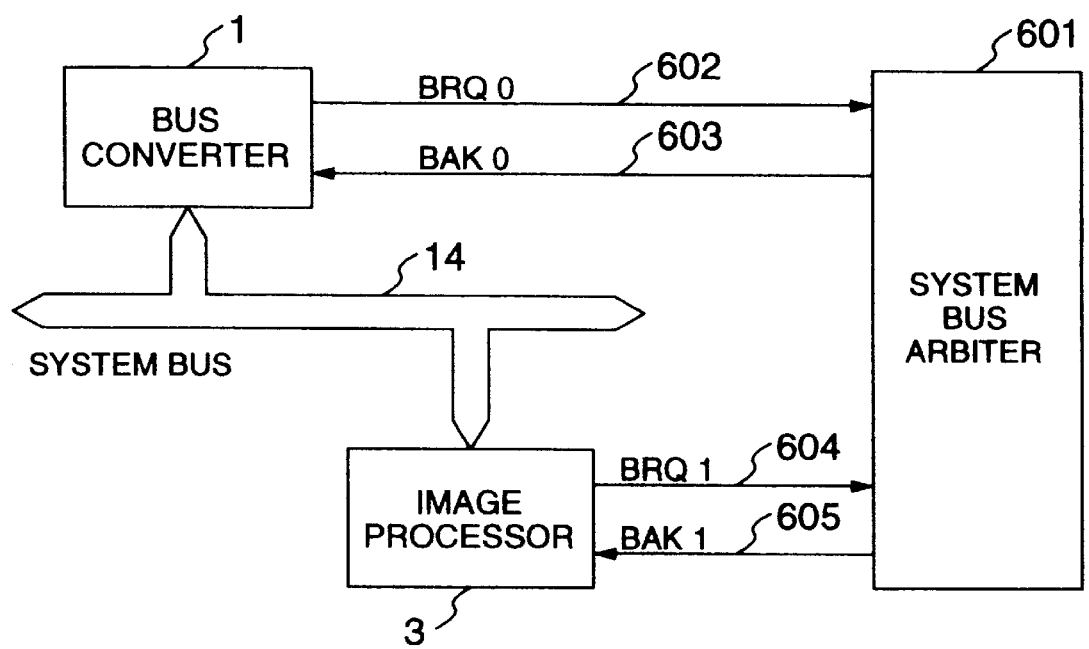
FIG. 6 is a connection diagram showing the relation of connection of bus use arbitration signals for a system bus according to the embodiment.
Figure 7:
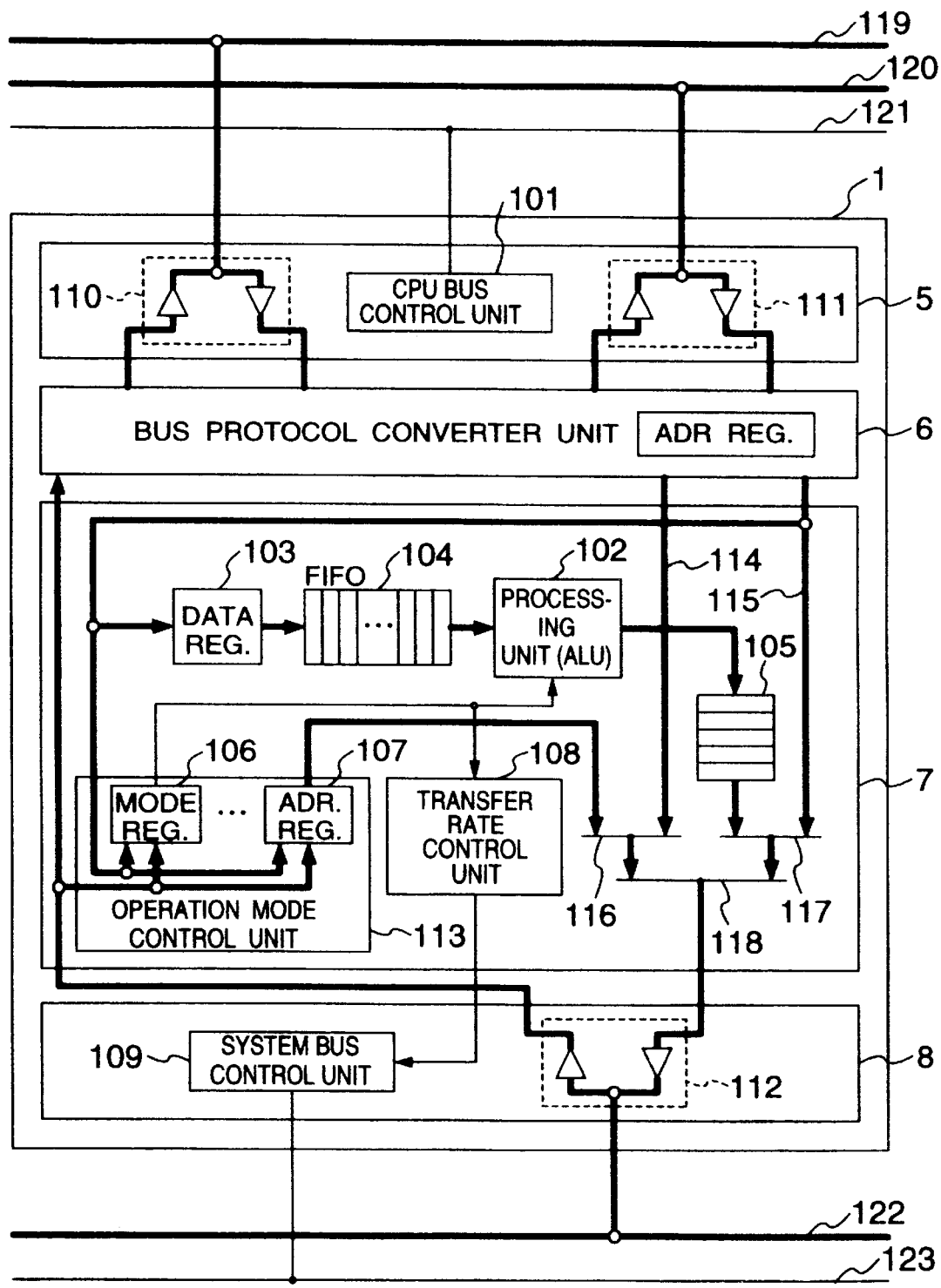
FIG. 7 is a detailed block diagram of a bus converter according to another embodiment of the present invention.

In FIG. 6, reference numeral 601 denotes a system bus arbiter for arbitrating the use of the system bus (or the right of using the system bus), numeral 602 a bus use request signal (BRQ0) for the system bus from the bus converter 1 to the system bus arbiter 601, numeral 603 a bus use acceptance signal (BAK0) from the system bus arbiter 601 to the bus converter 1, numeral 604 a bus use request signal (BRQ1) for the system bus from the image processing board 3 to the system bus arbiter 601, and numeral 605 a bus use acceptance signal (BAK1) from the system bus arbiter 601 to the image processing board 3.

Next, the operation of the system in one embodiment of the present invention will be described. First, consider the case where the bus converter 1 takes over a portion of a processing performed by the image processing board 3 on the system bus 14.

Referring to the block diagrams shown in FIGS. 1 and 2, the image processing board 3 writes data before operation through the system bus 14 into the operation data register 103 of the operation controller 7 provided in the bus converter 1. Similar to the data before operation, an address to be transferred after operation is written into the operation result transfer destination address register 107. The data before operation is transferred to the processing unit 102 through the FIFO 104 for data before operation. In the processing unit 102, an operation processing is performed in accordance with the contents set in the operation mode register 106 provided in the operation mode control unit 113. When the operation performed by the processing unit 102 is an operation which the dedicated hardware can perform at a higher speed than the CPU governing a general operation, the effect of the present invention as an information processing system is remarkable. Such an operation includes, for example, the compression/decompression of data.

An operation mode to be set into the operation mode setting register 106 is transferred by the image processing board 3 together with the data before operation and the operation result transfer destination address which the image processing board 3 transfers to the bus converter 1.

Thereupon, the operation data register 103 is written with not only the data before operation but also address identification information for identifying an address to be written into the operation result transfer destination address register 107 and operation mode identification information for identifying the operation mode.

The registers in the operation mode control unit 113 are set by the CPU 2 or the image processor 10 in the image processing board 3. Data subjected by the processing unit 102 to the operation processing is held in the FIFO 105 for data after operation together with the address identification information and the operation mode identification information so that it is then transferred to the image processing board side through the system bus 14. Hereupon, the operation mode control unit 113 refers to the address identification information held in the FIFO 105 to make a control of transferring the data after operation to the address designated by the operation result transfer destination address register 107. Alternatively, the operation result transfer destination address register 107 may be added with an incremental function so that the data is successively transferred to the work memory 11 of the image processing board 3. When data to be handled is data for the compression/decompression of a moving image or the like, there may occur the case where an operation for applying the order of precedence for transfer onto the system bus is necessitated in order to the frame rate of the image constant. This is governed by the transfer rate control unit 108. When a required transfer rate is high, operation data can be transferred onto the system bus with the precedence over the transfer request of a processor I/O (PIO) access from the CPU side. This control is set by use of the operation mode setting register 106.

A timing chart representing the timing of data transfer in the above case is shown in FIG. 4.

Referring to FIG. 6, when data is transferred on the system bus 14, each module on the bus asserts a bus use request signal for the system bus to the system bus arbiter 601 which arbitrates the use of the system bus. only a module receiving a bus use acceptance signal from the system bus arbiter 601 can use the system bus. Referring to FIG. 4, the first write transfer 411 is a write transfer cycle in which the image processing board 3 writes data before operation into the operation data register 103. The second write transfer 412 is a write transfer cycle in which data subjected to an operation processing and held in the FIFO 105 for data after operation is transferred to the image processing board side.

The present embodiment has been described in conjunction with the example in which the bus converter 1 automatically transfers data after operation to the image processing board 3. Alternatively, when a required processing speed is not high, the image processing board 3 may issue a read request to the FIFO 105 to read the result of operation. In this case, a control is made so that data held in the FIFO 105 for data after operation is successively read therefrom in the case where data is read from the operation data register 103.

A timing chart representing the timing of data transfer in that case is shown in FIG. 3.

Referring to FIG. 3, the first transfer 311 is a write transfer cycle in which the image processing board 3 writes data before operation into the operation data register 103. The second transfer 312 is a read transfer cycle in which the image processing board 3 reads data subjected to an operation processing and held in the FIFO 105 for data after operation.

Next, another embodiment of the present invention will be described using FIG. 7. This embodiment is different from the foregoing embodiment in that the input to the operation data register 103 is not the transfer from the system bus but the data signal line 115 from the bus protocol converter unit 6 to the operation controller 7.

The present embodiment is constructed such that in parallel to the transfer of data from the CPU 2 or the main memory 4 to the work memory 11 of the image processing board 3, an operation is performed for that data, thereby making it possible for the bus converter 1 to take over a portion of a processing to be performed by the CPU 2.

The transfer from the CPU 2 corresponds to processor I/O (PIO) access and the transfer from the main memory 4 corresponds to direct memory access (DMA). The present embodiment may include two transfer destination address designating methods as follows. These will now be described using the PIO access by way of example.

One transfer destination address designating method (1) is a method in which the CPU 2 writes data before operation on the basis of the gist of PIO write. Irrespective of an address designated by the CPU, PIO write data is written into the operation data register 103. Data before operation written in the operation data register 103 is transferred to the processing unit or arithmetic and logic unit (ALU) 102 through the FIFO 104 for data before operation.

The contents of an operation to be performed at the time of passage through the processing unit 102 are set into the operation mode setting register 106 provided in the operation mode control unit 113. The data subjected to the operation processing is held into the FIFO 105 for data after operation and is then transferred to the image processing board side through the system bus. The address of destination for transfer in that case is an address designated by the CPU 2 in a PIO write cycle. Whether or not this transfer path is to be used is determined by a value set in the operation mode setting register 106 provided in the operation mode control unit 113.

Another transfer destination address designating method (2) is a method in which the CPU 2 writes data before operation in a PIO write transfer cycle with an address of the operation data register 103 being designated. Data before operation written in the operation data register 103 is transferred to the processing unit 102 through the FIFO 104 for data before operation. The contents of an operation to be performed at the time of passage through the processing unit 102 are set into the operation mode setting register 106 provided in the operation mode control unit 113. Data subjected to the operation processing is held into the FIFO 105 for data after operation and is then transferred to the image processing board side through the system bus. The address of destination for transfer in that case can be set into the operation result transfer destination address register 107 provided in the operation mode control unit 113. Also, the operation result transfer destination address register 107 may be added with an incremental function so that the data is successively transferred to the work memory 11 of the image processing board 3.

In any transfer destination address designating method mentioned above, data before operation is written into the operation data register 103, the FIFO 104 for data before operation and the FIFO 105 for data after operation together with an address identifier and an operation mode identifier. And, the data before operation is subjected to an operation processing in accordance with an operation mode for the data before operation and an operation result transfer destination address after operation and is then transferred to the operation result transfer destination address.

Though the case of PIO write has been described in the above, a control in the case of PIO read can be made similarly by providing a series of an operation data register, an FIFO for data before operation and an FIFO for data after operation in a path directed to the CPU 2.

Also, the transfer destination address designating methods (1) and (2) mentioned above can be applied to the DAM type transfer similarly.

Concrete contents of an operation may include not only simple logical and mathematical (or arithmetic) operations but also a Huffman encoding circuit required for the decompression of a compressed image, and so on. In the present invention, therefore, the FIFO 104 for data before operation and the FIFO 105 for data after operation are provided in order that a pretty large amount of data can be utilized for an operation.

In the system construction, the main memory may be connected to the CPU bus, as shown in FIG. 2 or may be connected directly to the bus converter, as shown in FIG. 5.

According to the present invention mentioned above, an operation processing unit is provided in a bus converter. Therefore, it is possible to reduce a data transfer amount in bus hierarchy transition in comparison with the case where the transfer of data before an operation and the result of operation is made between the CPU bus side module (such as a CPU or a main memory) and the system bus side module (or an I/O module such as a graphic device). Namely, an overhead time for data transfer and a load imposed on buses are reduced, thereby improving the total performance of the system. Also, a processing unqualified for the CPU, for example, a bit operation can be performed by a dedicated hardware. Therefore, the information processing performance can also be improved. Further, the bus converter itself takes over a portion of an operation. Therefore, processings to be performed are prevented from concentrating on the CPU or the system bus side I/O module (such as a graphic device). As a result, it becomes possible to reduce the costs of individual parts used in the system.

What is claimed is:

1. An information processing system comprising:
    a first bus;
    a first module coupled to said first bus;
    a second bus;
    a second module coupled to said second bus;
    a data transfer unit coupled to said first bus and said second bus, wherein said data transfer unit includes an operation processor which processes data transferred between said first bus and said second bus,
    wherein said operation processor performs a data processing operation, including an image compression/decompression, a logical function and an arithmetic function of data transferred between said first bus and said second bus.

2. An information processing system according to claim 1, wherein said data transfer unit further includes a bus protocol converter.

3. An information processing system according to claim 2, wherein said bus protocol converter performs a protocol conversion of data transferred between said first bus and said second bus.

4. An information processing system according to claim 1, wherein said operation processor performs a bit operation of data transferred between said first bus and said second bus.

5. An information processing system according to claim 3, wherein said operation processor selectively processes data transferred between said first bus and said second bus in accordance with a designation from at least one of said first and second modules on said first bus and said second bus, independently from said protocol conversion.

6. An information processing system according to claim 1, wherein said first bus corresponds to a CPU bus providing access to a CPU, and said second bus corresponds to a system bus providing access to an image processor.

7. An information processing system comprising:
    a first bus;
    a first module coupled to said first bus;
    a second bus;
    a second module coupled to said second bus;
    a data transfer unit coupled to said first bus and said second bus, wherein said data transfer unit operates in a plurality of data transfer modes, including:
        a first mode which inputs data from said first bus in accordance with a first protocol, and then outputs said data inputted from said first bus to said second bus in accordance with a second protocol, and
        a second mode which inputs data from said first bus in accordance with said first protocol, processes said data inputted from said first bus, and then outputs processed data to said second bus in accordance with said second protocol.

8. An information processing system according to claim 7, wherein said data transfer unit includes a first bus interface which inputs data from said first bus, a bus protocol converter which converts a protocol of said data, an operation processor which processes said data, and a second bus interface which outputs said data to said second bus.

9. An information processing system according to claim 8, wherein said operation processor selectively processes data transferred between said first bus and said second bus in accordance with a designation from at least one of said first and second modules on said first bus and said second bus, independently from a protocol conversion.

10. An information processing system according to claim 7, wherein said first bus corresponds to a CPU bus providing access to a CPU, and said second bus corresponds to a system bus providing access to an image processor.

11. An information processing system according to claim 8, wherein said operation processor comprises:
    a data register arranged to register data from one of said first bus and said second bus;
    a first storage unit arranged to store data registered from said data register for a data processing operation;
    an arithmetic logic unit (ALU) arranged to perform said data processing operation and to produce processed data;
    a second storage unit arranged to store the processed data after said data processing operation;
    a transfer rate control unit arranged to control the transfer of data between said first bus and said second bus; and
    an operation mode control unit arranged to control said data processing operation in accordance with a designation from at least the module connected on one of said first bus and said second bus.

12. An information processing system according to claim 11, wherein said first storage unit and said second storage unit each corresponds to a first-in/first-out (FIFO), and said operation mode control unit includes registers which register said designation from at least the module connected on one of said first bus and said second bus and a related address.

13. An information processing system according to claim 11, wherein said first bus interface and said second bus interface each includes one or more bidirectional buffers arranged to provide a temporary storage for data transferred between said first bus and said second bus.

14. An information processing system comprising:
    a first bus;
    a first module coupled to said first bus;
    a second bus;
    a second module coupled to said second bus;
    a data transfer unit coupled to said first bus and said second bus, wherein said data transfer unit includes an operation processor which processes data transferred between said first bus and said second bus, wherein said operation processor comprises:
        a data register arranged to register data from one of said first bus and said second bus;
        a first storage unit arranged to store data registered from said data register for a data processing operation;
        an arithmetic logic unit (ALU) arranged to perform said data processing operation and to produce processed data;
        a second storage unit arranged to store the processed data after said data processing operation;
        a transfer rate control unit arranged to control the transfer of data between said first bus and said second bus; and an operation mode control unit arranged to control said data processing operation in accordance with a designation from at least the module connected on one of said first bus and said second bus.

15. An information processing system according to claim 14, wherein said first storage unit and said second storage unit each corresponds to a first-in/first-out (FIFO), and said operation mode control unit includes registers which register said designation from at least the module connected on one of said first bus and said second bus and a related address.

16. An information processing system according to claim 15, wherein said first bus interface and said second bus interface each includes one or more bidirectional buffers arranged to provide a temporary storage for data transferred between said first bus and said second bus.

17. An information processing system comprising:
   a first bus;
   a first module coupled to said first bus;
   a second bus;
   a second module coupled to said second bus;
   a data transfer unit coupled to said first bus and said second bus, to control the transfer of data between said first bus and said second bus, wherein said data transfer unit operates in a plurality of data transfer modes, including:
      a first mode in which data is received from said first bus in accordance with a first protocol, and then transferred to said second bus in accordance with a second protocol; and
      a second mode in which data is received from said first bus in accordance with said first protocol, processed and then processed data is transferred to said second bus in accordance with said second protocol.

18. An information processing system according to claim 17, wherein said data transfer unit includes a first bus interface which receives data from said first bus; a bus protocol converter which converts a protocol of data received from said first bus; an operation processor which processes said data, and a second bus interface which transfers said data to said second bus.

19. An information processing system according to claim 18, wherein said operation processor performs a data processing operation, including an image compression/decompression, a logical function and an arithmetic function of data transferred between said first bus and said second bus.

20. An information processing system according to claim 17, wherein said first bus corresponds to a CPU bus providing access to a CPU, and said second bus corresponds to a system bus providing access to an image processor.

21. An information processing system according to claim 18, wherein said operation processor comprises:
   a data register arranged to register data from one of said first bus and said second bus;
   a first storage unit arranged to store data registered from said data register for a data processing operation;
   an arithmetic logic unit (ALU) arranged to perform said data processing operation and to produce processed data;
   a second storage unit arranged to store the processed data after said data processing operation;
   a transfer rate control unit arranged to control the transfer of data between said first bus and said second bus; and
   an operation mode control unit arranged to control said data processing operation in accordance with a designation from at least the module connected on one of said first bus and said second bus.

22. An information processing system according to claim 21, wherein said first storage unit and said second storage unit each corresponds to a first-in/first-out (FIFO), and said operation mode control unit includes registers which register said designation from at least the module connected on one of said first bus and said second bus and a related address.

23. An information processing system according to claim 21, wherein said first bus interface and said second bus interface each includes one or more bidirectional buffers arranged to provide a temporary storage for data transferred between said first bus and said second bus.

24. An information processing system according to claim 21, wherein said operation processor selectively processes data transferred between said first bus and said second bus in accordance with a designation from at least one of said first and second modules on said first bus and said second bus, independently from a protocol conversion.

\* \* \* \* \*

UNITED STATES PATENT AND TRADEMARK OFFICE
CERTIFICATE OF CORRECTION

PATENT NO. : 6,584,538 B2
DATED : June 24, 2003
INVENTOR(S) : Kondo et al.

It is certified that error appears in the above-identified patent and that said Letters Patent is hereby corrected as shown below:

Title page,
Item [63], should read as follows:
-- Related U.S. Application Data
[63]  Continuation of application No. 09/053,069 filed on Apr. 1, 1998, now U.S. Patent No. 6,330,629, which is a continuation-in-part of application No. 08/847,974, filed on Apr. 21, 1997, now U.S. Patent No. 5,881,255, which is a continuation of application No. 08/544,727, filed on Oct. 18, 1995, now U.S. Patent No. 5,671,371, which is a continuation of application No. 08/016,692, filed on Feb. 11, 1993, now abandoned. --

Signed and Sealed this

Twenty-third Day of December, 2003

JAMES E. ROGAN
*Director of the United States Patent and Trademark Office*